(12) United States Patent
Guo

(10) Patent No.: US 11,022,739 B2
(45) Date of Patent: Jun. 1, 2021

(54) ELECTRONIC CANDLE

(71) Applicant: Yangzhou Mingpin Arts & Crafts Co., Ltd., Yangzhou (CN)

(72) Inventor: Yongxiang Guo, Yangzhou (CN)

(73) Assignee: Yangzhou Mingpin Arts & Crafts Co., Ltd., Yangzhou (CN)

( * ) Notice: Subject to any disclaimer, the term of this patent is extended or adjusted under 35 U.S.C. 154(b) by 21 days.

(21) Appl. No.: 16/331,368

(22) PCT Filed: Nov. 6, 2018

(86) PCT No.: PCT/CN2018/114042
§ 371 (c)(1),
(2) Date: Mar. 7, 2019

(87) PCT Pub. No.: WO2019/105186
PCT Pub. Date: Jun. 6, 2019

(65) Prior Publication Data
US 2020/0284966 A1    Sep. 10, 2020

(30) Foreign Application Priority Data
Nov. 28, 2017    (CN) .......................... 201721611675.5

(51) Int. Cl.
F21S 6/00      (2006.01)
F21V 8/00      (2006.01)
(Continued)

(52) U.S. Cl.
CPC ............ *G02B 6/0008* (2013.01); *F21S 6/001* (2013.01); *F21S 9/02* (2013.01); *F21S 10/04* (2013.01);
(Continued)

(58) Field of Classification Search
CPC . G02B 6/0008; F21V 23/045; F21V 33/0056; F21V 23/004; F21S 9/02;
(Continued)

(56) References Cited

U.S. PATENT DOCUMENTS

| 7,575,356 B1* | 8/2009 | Bouchard ................ A44C 1/00 |
| | | 362/565 |
| 2002/0093834 A1* | 7/2002 | Yu .......................... F21S 6/001 |
| | | 362/565 |

(Continued)

FOREIGN PATENT DOCUMENTS

| CN | 102382718 A | 3/2012 |
| CN | 103574486 A | 2/2014 |

(Continued)

*Primary Examiner* — Donald L Raleigh
(74) *Attorney, Agent, or Firm* — Fisherbroyles LLP

(57) ABSTRACT

An electronic candle comprising: a candle housing having a top and defining a cavity, a through-hole at the top, and a plurality of mounting apertures in communication with the cavity; a base disposed at the bottom of the candle housing and comprising a power supply and a PCB integrated circuit board having a control chip; a candle shell disposed on the top and being connected to the through-hole; an LED assembly electrically coupled to the power supply and disposed in the cavity; a plurality of optical fibers connected to said LED assembly and formed into optical fiber bundles, the plurality of optical fibers having end sections disposed in the mounting apertures; and a candle flickering LED lighting tube connected to said LED assembly and disposed at least partially in the candle shell.

10 Claims, 3 Drawing Sheets

(51) Int. Cl.
  *F21S 9/02* (2006.01)
  *F21S 10/04* (2006.01)
  *F21V 23/00* (2015.01)
  *F21V 23/04* (2006.01)
  *F21V 33/00* (2006.01)
  *F21Y 115/10* (2016.01)
  *F21W 121/00* (2006.01)

(52) U.S. Cl.
  CPC .......... *F21V 23/004* (2013.01); *F21V 23/045* (2013.01); *F21V 33/0056* (2013.01); *F21W 2121/00* (2013.01); *F21Y 2115/10* (2016.08)

(58) Field of Classification Search
  CPC ....... F21S 6/001; F21S 10/04; F21Y 2115/10; F21W 2121/00
  See application file for complete search history.

(56) References Cited

U.S. PATENT DOCUMENTS

| | | | |
|---|---|---|---|
| 2006/0046220 A1 | 3/2006 | Lin | |
| 2007/0003894 A1 | 1/2007 | Yu | |
| 2008/0123353 A1* | 5/2008 | Liu | ................... F21V 33/0052 362/375 |
| 2014/0268821 A1 | 9/2014 | Yang | |
| 2017/0367163 A1* | 12/2017 | Li | ............................ F21S 9/02 |

FOREIGN PATENT DOCUMENTS

| | | |
|---|---|---|
| CN | 203549671 U | 4/2014 |
| CN | 108826205 A | 11/2018 |

* cited by examiner

ELECTRONIC CANDLE

CROSS-REFERENCE TO RELATED APPLICATIONS

This application is a national stage application of International Application No. PCT/CN2018/114042, filed Nov. 6, 2018, which claims priority to Chinese Application No. 201721611675.5, filed Nov. 28, 2017, the entire disclosure of each of which is hereby incorporated herein by reference.

TECHNICAL FIELD

The present invention relates to a novel electronic candle.

BACKGROUND

The initial appearance of the candle was to help solve lighting problem for humans, and slowly the candle became a decoration, a ritual. In the past decade, the advent of electronic candles has replaced traditional candles gradually due to its convenience, energy saving and safety. The advantages of electronic candles is in that they possess more decorative effect than traditional candles, and the unique luminous visual effect of this new type of fiber optic candle is beyond comparison to traditional candles.

The existing electronic candles generally intended to continuously improve the effect of the core lighting to infinitely approach the candlelight effect of real candles, or to add various light color changes, or the effects of music, fountains, etc., in the candle housing, but no design is made on the outer surface of the candle housing.

The present invention utilizes the light guiding property of the optical fiber, and combines the optical fiber and the candle through improvement, and forms dots into a line, lines into a plane, and the original plain candle surface is made into flickering effect of neon light.

SUMMARY

The technical problem solved by the invention is to overcome the defects of the prior art and present a novel electronic candle.

The purpose of the invention is achieved by the following technical solutions:

A novel electronic candle is provided, comprising an electronic candle housing with a cavity, a base and an electronic candle core plastic soft shell, in which the base is disposed at the bottom of the electronic candle housing, characterized in that, the cavity is provided internally with super high brightness LED assembly, optical fiber bundles formed from a plurality of optical fibers, and a candle flickering LED lighting tube.

The electronic candle housing is provided with a through-hole at the top, and the electronic candle core plastic soft shell is disposed at the top of the electronic candle housing and connected with the through-hole, the electronic candle core plastic soft shell is internally provided with a candle flickering LED lighting tube, the base is provided with a power supply and a super high brightness LED assembly, and one side of the power supply is provided with a PCB integrated circuit board and an integrated circuit control chip, and the integrated circuit control chip is disposed on the PCB integrated circuit board, the super high brightness LED assembly, the candle flickering LED lighting tube, the PCB integrated circuit board and the integrated circuit control chip are all electrically connected with the power supply.

The electronic candle housing is provided with a plurality of mounting apertures in communication with the cavity, and the optical fiber bundles formed from the plurality of optical fibers are connected to the super high brightness LED assembly, and end sections of the plurality of optical fibers are disposed in the mounting apertures, respectively, and are fixed in the mounting apertures using transparent glue.

Further, the novel electronic candle further comprises an infrared remote controller, and the PCB integrated circuit board is provided with an infrared remote control signal receiver device, and the infrared remote controller is used in combination with the infrared remote control signal receiver device.

Further, the power supply comprises a battery cartridge and a battery cartridge lid, the battery cartridge is provided with a battery, and the base is further provided with a battery switch for switching on and off the battery; the base is provided with a speaker and a speaker cartridge, the speaker and the speaker cartridge are both disposed on one side of the battery cartridge, and the speaker and the speaker cartridge are electrically connected with the PCB integrated circuit board, and the base is provided with a speaker sound hole, and the speaker sound hole is located below the speaker.

Further, lower portion of the cavity has an opening, the base is disposed at the opening of the lower portion of the cavity, and the base is adapted to the opening of the lower portion of the cavity.

Further, the super high brightness LED assembly which provides light supply for the optical fibers is a super high brightness, low current lighting tube.

Further, the number of the optical fiber bundles is consistent with the number of the super high brightness, low current lighting tube.

Further, the pattern formed by distribution of the mounting apertures is a line, a circle, a LOGO, a text, a snowflake or a star, and the integrated circuit control chip safely processes the current supplied by the power supply, and then provides a sufficient safety current to the super high brightness, low current lighting tube, and the integrated circuit control chip causes the super high brightness, low current lighting tube to flicker, so that the pattern formed by the distribution of the mounting apertures flickers.

For example, when the pattern formed by the distribution of the mounting apertures is a snowflake pattern, the optical fiber bundles can be made into three bundles of optical fibers, so that the optical fibers alternately dim and flicker to form a snowing effect; or a pattern with two sets of star shape is formed, with alternately dimming and flickering starlight; or when a heart shape is formed, flickering of the super high brightness, low current lighting tube is used to simulate the visual effect of heartbeat.

Further, the optical fiber bundles and the super high brightness LED assembly are closely fitting connected by a rubber tube.

Further, the housing of the electronic candle is made of a transparent or semitransparent material, and the housing of the electronic candle has a thickness of 4 to 8 mm.

The diameter of the mounting apertures on the candle housing is slightly smaller than that of the optical fibers, and because the candle is soft, and the optical fibers are hard, relatively, the optical fibers would not slip easily during threading process.

Further, the candle flickering LED lighting tube is fixed in the electronic candle core plastic soft shell with hot-melt adhesive, and the fixing method is reliable and simple, which not only achieves the candlelight effect for the electronic candle, but also affects the lighting effect of the light guiding optical fibers in the mounting apertures of the electronic candle housing.

Further, the diameters of the optical fibers may be different from one another and may be disposed in the cavity of the electronic candle housing with a mixture of thick and thin ones.

Compared with the prior art, the invention has the following beneficial effects:

The electronic candle of the present invention, the electronic candle housing is provided internally with a cavity, and the electronic candle housing is designed with mounting apertures for mounting the optical fibers, and the mounting apertures are arranged according to actual needs, and different arrangements of the mounting apertures can present different patterns or logos and the like. Each of the mounting apertures has an optical fiber passing through the cavity, and the cavity has a super high brightness LED assembly inside, and the other ends of the optical fibers are integrated into optical fiber bundles connecting the super high brightness LED assembly within the cavity; an LED lighting tube with candle flickering effect mounted within the electronic candle core plastic soft shell on the top of the electronic candle housing. Since the optical fibers are transparent, the novel electronic candle of the invention has no obvious optical fiber heads trace on its outer surface when the super high brightness LED assembly does not light up, and when the super high brightness LED assembly lights up, light is emitted out of the mounting apertures on the electronic candle housing under the effect of the optical fibers in the cavity, and light-emitting points formed by the plurality optical fibers form a light-emitting dynamic pattern; since the electronic candle housing is semitransparent, when the light-emitting points on the surface of the electronic candle housing converge into a flickering pattern, which matches with mapping of the super high brightness LED assembly in the electronic candle housing, cooperates with the star-shaped light formed from the light-emitting points on the surface of the electronic candle housing to complement each other.

1. Electronic candle housing, 2. Cavity, 3. Optical fiber, 4. Electronic candle core plastic soft faux candle flame shell, 5. Candle flickering LED lighting tube, 6. super high brightness LED lighting tube, 7. Integrated circuit control chip, 8. Battery cartridge, 9. Speaker cartridge, 10. Speaker, 11. PCB integrated circuit board, 12. Infrared remote control receiver device, 13. Base, 14. Speaker sound hole, 15. Battery cartridge lid, 16. Battery switch, 17. Mounting aperture, 18. Transparent glue.

DETAILED DESCRIPTION OF THE EMBODIMENTS

The present invention will be further described below in conjunction with specific embodiments. The drawings are for illustrative purposes only, and are merely illustrative, rather than physical, and are not to be construed as limiting the scope of the invention; in order to better illustrate the embodiments of the invention, some parts of the drawings may be omitted, enlarged or reduced and thus do not represent the size of the actual product; it will be understood by those skilled in the art that certain known structures and description thereof may be omitted.

Figure 1:
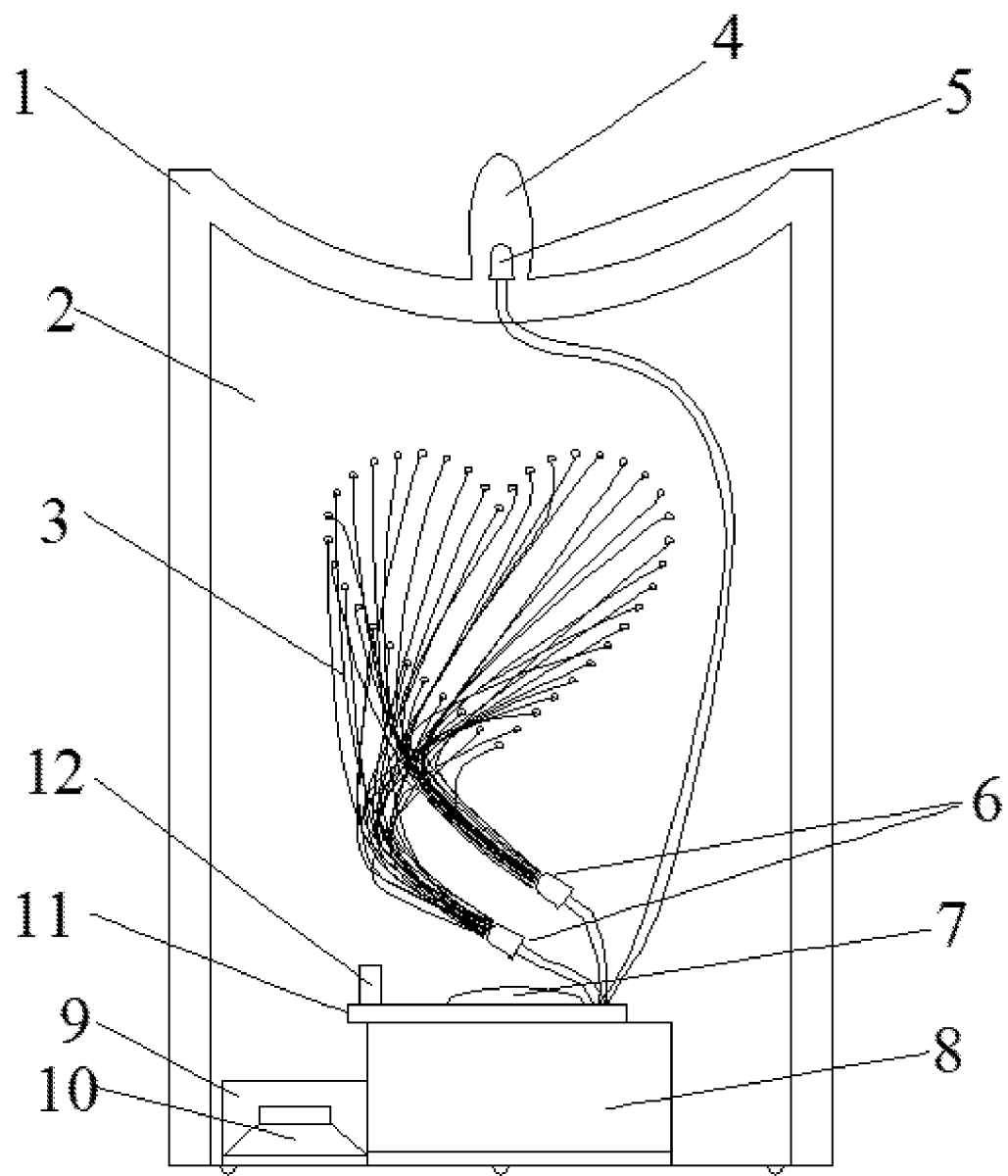
FIG. 1 is a schematic view of the structure of the novel electronic candle of the present invention.
Figure 2:
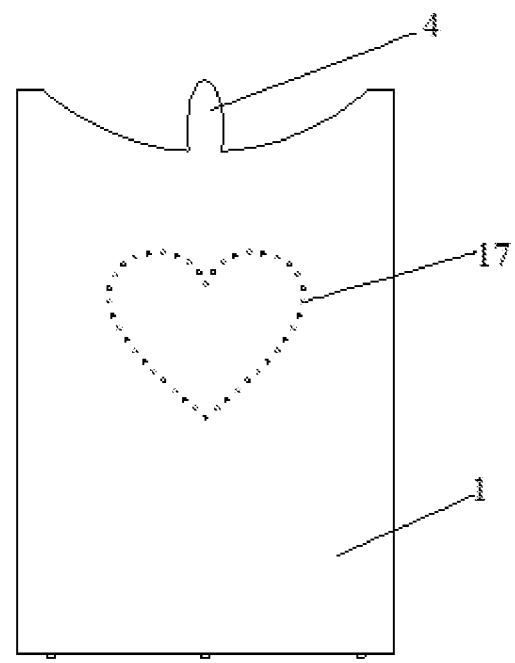
FIG. 2 is a schematic view of the bottom structure of the novel electronic candle of the present invention.
Figure 3:
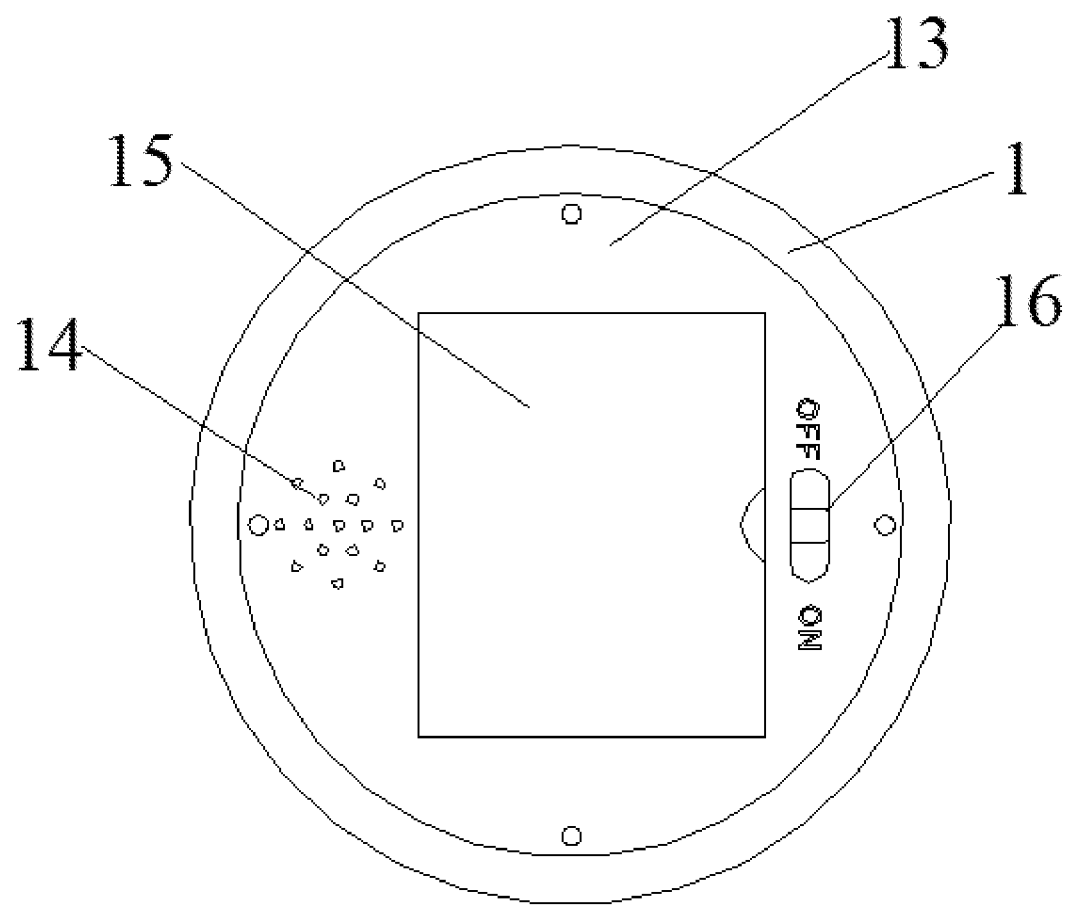
FIG. 3 is a schematic view of the bottom structure of the novel electronic candle of the present invention.
Figure 4:
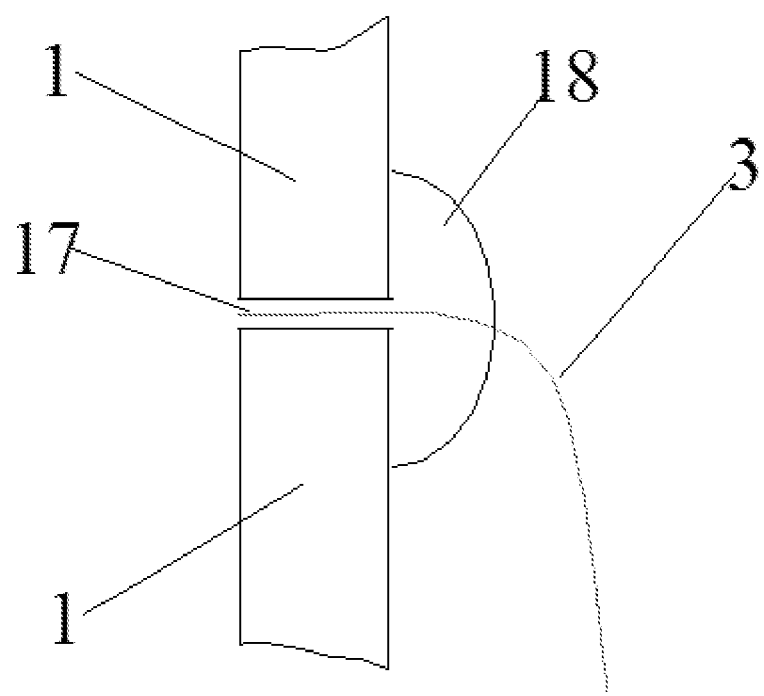
FIG. 4 is a schematic view of the bottom structure of the novel electronic candle of the present invention.

As shown in FIGS. 1 to 4, a novel electronic candle is provided, comprising an electronic candle housing 1 with a cavity 2, a base 13 and an electronic candle core plastic soft faux candle flame shell 4, the base 13 is disposed at the bottom of the electronic candle housing 1, the cavity 2 is provided internally with super high brightness LED assembly 6, optical fiber bundles formed from a plurality of optical fibers 3, and a candle flickering LED lighting tube 5.

The electronic candle housing 1 is provided with a through-hole at the top, and the electronic candle core plastic soft faux candle flame shell 4 is disposed at the top of the electronic candle housing 1 and connected with the through-hole, the electronic candle core plastic soft shell 4 is internally provided with a candle flickering LED lighting tube 5, the base 13 is provided with a power supply and a super high brightness LED assembly 6, and one side of the power supply is provided with a PCB integrated circuit board 11 and an integrated circuit control chip 7, and the integrated circuit control chip 7 is disposed on the PCB integrated circuit board 11, the super high brightness LED assembly 6, the candle flickering LED lighting tube 5, the PCB integrated circuit board 11 and the integrated circuit control chip 7 are all electrically connected with the power supply.

The electronic candle housing 1 is provided with a plurality of mounting apertures 17 in communication with the cavity 2, and the optical fiber bundles formed from the plurality of optical fibers 3 are connected to the super high brightness LED assembly 6, and end sections of the plurality of optical fibers 3 are disposed in the mounting apertures 17, respectively, and are fixed in the mounting apertures 17 using transparent glue 18.

As an improvement of the above embodiment, the novel electronic candle further comprises an infrared remote controller, and the PCB integrated circuit board 11 is provided by welding with an infrared remote control signal receiver device 12, and the infrared remote controller is used in combination with the infrared remote control signal receiver device 12.

As a modification of the above embodiment, the power supply comprises a battery cartridge 8 and a battery cartridge lid 15, the battery cartridge 8 is provided with a battery, and the base 13 is further provided with a battery switch 16 for switching on and off the battery; the base 13 is provided with a speaker 10 and a speaker cartridge 9, the speaker 10 and the speaker cartridge 9 are both disposed on one side of the battery cartridge 8, and the speaker 10 and the speaker cartridge 9 are electrically connected with the PCB integrated circuit board 11, and the base 13 is provided with a speaker sound hole 14, and the speaker sound hole 14 is located below the speaker 10.

As a modification of the above embodiment, lower portion of the cavity 2 has an opening, the base 13 is disposed at the opening of the lower portion of the cavity 2, and the base 13 is adapted to the opening of the lower portion of the cavity 2.

As a modification of the above embodiment, the super high brightness LED assembly 6 which provides light supply for the optical fibers 3 is a super high brightness, low current lighting tube.

As an improvement of the above embodiment, the number of the optical fiber bundles is consistent with the number of the super high brightness, low current lighting tube.

As a modification of the above embodiment, the pattern formed by distribution of the mounting apertures 17 is a line, a circle, a LOGO, a text, a snowflake or a star, and the integrated circuit control chip 7 safely processes the current supplied by the power supply, and provides a sufficient safety current to the super high brightness, low current lighting tube, and the integrated circuit control chip 7 causes the super high brightness, low current lighting tube to flicker, so that the pattern formed by the distribution of the mounting apertures 17 flickers.

For example, when the pattern formed by the distribution of the mounting apertures 17 is a snowflake pattern, the optical fiber bundles can be made into three bundles of optical fibers, so that the optical fibers 3 alternately dim and flicker to form a snowing effect; or a star shape pattern with two set of star shapes is formed, with alternately dimming and flickering starlight; or when a heart shape is formed, flickering of the super high brightness, low current lighting tube is used to simulate the visual effect of heartbeat.

As a modification of the above embodiment, the optical fiber bundles and the super high brightness LED assembly 6 are closely fitting connected by a rubber tube.

As a modification of the above embodiment, Further, the housing of the electronic candle is made of a transparent or semitransparent material, and the electronic candle housing 1 has a thickness of 4 to 8 mm.

The diameter of the mounting apertures 17 on the candle housing is slightly smaller than that of the optical fibers 3, and because the candle is soft, and the optical fibers 3 are hard, relatively, the optical fibers 3 do not slip easily during threading process.

As an improvement of the above embodiment, the candle flickering LED lighting tube 5 is fixed in the electronic candle core plastic soft faux candle flame shell 4 with hot-melt adhesive, and the fixing method is reliable and simple, which not only achieves the candlelight effect for the electronic candle, but also affects the lighting effect of the optical fibers 3 in the mounting apertures 17 of the electronic candle housing 1.

As a modification of the above embodiment, the diameters between the optical fibers 3 may be different from one another with a mixture of thick and thin ones and may be disposed in the cavity 2 of the electronic candle housing 1.

The electronic candle of the present invention, the electronic candle housing 1 is provided internally with a cavity 2, and the electronic candle housing 1 is designed with mounting apertures 17 for mounting the optical fibers 3, and the mounting apertures 17 are arranged according to actual needs, and different arrangements of the mounting apertures 17 can present different patterns or logos and the like. Each of the mounting apertures 17 has an optical fiber 3 passing through the cavity 2, and the cavity 2 has a super high brightness LED assembly 6 inside, and the other end sections of the optical fibers 3 are integrated into optical fiber bundles connecting the super high brightness LED assembly 6 within the cavity 2; a candle flickering effect LED lighting tube mounted within the electronic candle core plastic soft faux candle flame shell 4 on the top of the electronic candle housing 1. Since the optical fibers 3 are transparent, the novel electronic candle of the invention has no obvious optical fiber heads trace on its outer surface when the super high brightness LED assembly 6 does not light up, and when the super high brightness LED assembly 6 lights up, light is emitted out of the mounting apertures 17 on the electronic candle housing 1 under the effect of the optical fibers 3 in the cavity 2, and light-emitting points formed by the plurality optical fibers 3 form a light-emitting dynamic pattern; since the electronic candle housing 1 is semitransparent, when the light-emitting points on the surface of the electronic candle housing 1 converge into a flickering pattern, which matches with mapping of the super high brightness LED assembly 6 in the electronic candle housing 1, cooperates with the star-shaped light formed from the light-emitting points on the surface of the electronic candle housing 1 to complement each other.

The novel electronic candle of the present invention is further provided with a speaker 10 and a speaker cartridge 9 for playing music files stored in the integrated circuit control chip 7 to add the music playing function; and the novel electronic candle of the present invention can also switch on/off remotely light of the super high brightness LED assembly 6 and music playing function with a remote controller.

It is to be understood that the above-described embodiments are merely illustrative of the technical solutions of the present invention and are not intended to limit the embodiments of the present invention. The connection means described above: movable connection, fixed connection, inter-connection, etc., are one or more of welding, bolting, riveting, embedment connection, hinge or pin connection, etc., and other variations or modifications of various forms may be made by those skilled in the art based on the above description. Any modifications, equivalents and improvements made within the spirit and scope of the invention are intended to be included within the scope of the invention.

What is claimed is:
1. An electronic candle, comprising:
   a candle housing having a top and defining a cavity, and a plurality of apertures in communication with the cavity;
   a base disposed at the bottom of the candle housing and comprising a power supply and a PCB integrated circuit board having a control chip;
   a faux candle flame shell disposed on the top of said candle housing;
   an LED assembly electrically coupled to the power supply and disposed in the cavity;
   a plurality of optical fibers connected to said LED assembly and formed into optical fiber bundles, the plurality of optical fibers having end sections disposed at the apertures, wherein the mounting apertures form a pattern; and
   a candle flickering LED lighting tube separate from said plurality of optical fibers, said candle flickering LED lighting tube being connected to said LED assembly and disposed at least partially in the faux candle flame shell.
2. The electronic candle of claim 1, further comprising an infrared remote controller, and the PCB integrated circuit board is provided with an infrared remote control signal receiver device, and the infrared remote controller is used in combination with the infrared remote control signal receiver device.

3. The electronic candle of claim 1, wherein the power supply comprises a battery cartridge and a battery cartridge lid, the battery cartridge is provided with a battery, and the base is further provided with a battery switch for switching on and off the battery.

4. The electronic candle of claim 3, wherein; the base is provided with a speaker and a speaker cartridge, the speaker and the speaker cartridge are both disposed on one side of the battery cartridge, and the speaker and the speaker cartridge are electrically connected with the PCB integrated circuit board.

5. The electronic candle of claim 1, wherein a lower portion of the cavity has an opening, the base is disposed at the opening of the lower portion of the cavity, and the base is adapted to the opening of the lower portion of the cavity.

6. The electronic candle of claim 1, wherein the LED assembly comprises one or more low current lighting tubes.

7. The electronic candle of claim 6, wherein the number of the optical fiber bundles equals the number of the low current lighting tubes.

8. The electronic candle of claim 1, wherein the housing of the electronic candle is made of a semitransparent material, and the housing of the electronic candle has a thickness of 4 to 8 mm.

9. The electronic candle of claim 1, wherein the pattern is a line, a circle, a LOGO, a text, a snowflake, a heart or a star.

10. The electronic candle of claim 1, wherein said end sections are disposed in said apertures.

* * * * *